(12) United States Patent
Wichelmann

(10) Patent No.: US 7,189,157 B2
(45) Date of Patent: Mar. 13, 2007

(54) METHOD AND A DEVICE FOR THE PREPARATION OF SLAUGHTERED POULTRY FOR PICKING

(75) Inventor: Bernhard Wichelmann, Lohne (DE)

(73) Assignee: Linco Food Systems A/S, Trige (DK)

( * ) Notice: Subject to any disclaimer, the term of this patent is extended or adjusted under 35 U.S.C. 154(b) by 0 days.

(21) Appl. No.: 10/700,529

(22) Filed: Nov. 5, 2003

(65) Prior Publication Data
US 2005/0107022 A1   May 19, 2005

(51) Int. Cl.
 *A22C 21/04* (2006.01)
(52) U.S. Cl. ............................................. 452/77
(58) Field of Classification Search .................. None
See application file for complete search history.

(56) References Cited

U.S. PATENT DOCUMENTS

| | | | |
|---|---|---|---|
| 2,152,082 A | | 3/1939 | Onorato et al. |
| 3,074,103 A | | 1/1963 | Roth et al. |
| 3,320,632 A | * | 5/1967 | Oehring ........................ 452/77 |
| 3,657,768 A | * | 4/1972 | Snowden ...................... 452/77 |
| 3,748,691 A | | 7/1973 | Snowden |
| 5,045,021 A | * | 9/1991 | Borup .......................... 452/74 |
| 5,439,694 A | * | 8/1995 | Morris, Jr. ................... 426/511 |
| 5,484,332 A | * | 1/1996 | Leech et al. ................. 452/173 |
| 5,853,320 A | * | 12/1998 | Wathes et al. ................ 452/88 |
| 5,882,253 A | * | 3/1999 | Mostoller ..................... 452/173 |
| 5,938,519 A | * | 8/1999 | Wright ......................... 452/173 |
| 5,980,375 A | * | 11/1999 | Anderson et al. ............. 452/77 |
| 5,980,377 A | * | 11/1999 | Zwanikken et al. ......... 452/184 |
| 6,551,182 B2 | * | 4/2003 | Caracciolo, Jr. ............. 452/81 |
| 6,605,308 B2 | * | 8/2003 | Shane et al. ................. 426/332 |

FOREIGN PATENT DOCUMENTS

| | | |
|---|---|---|
| DE | 2 007 305 | 2/1971 |
| DE | 101 48 568 A1 | 4/2003 |
| EP | 1 297 748 A1 | 4/2003 |
| GB | 1 148932 | 4/1969 |

* cited by examiner

*Primary Examiner*—Thomas Price
(74) *Attorney, Agent, or Firm*—Antonelli, Terry, Stout and Kraus, LLP.

(57) ABSTRACT

A method and a device is disclosed for the preparation of poultry for picking wherein the bodies of the poultry are scalded. Water vapor (5) is introduced into a scalding compartment (2). The scalding compartment (2) is heated to a predetermined temperature. The bodies (9) of the slaughtered poultry are introduced into the heated scalding compartment (2), within the scalding compartment (2). At least one flow of the water vapor-air mixture (5') is generated, and the flow is guided against predetermined regions of at least one of the bodies (9) of the poultry.

27 Claims, 4 Drawing Sheets

METHOD AND A DEVICE FOR THE PREPARATION OF SLAUGHTERED POULTRY FOR PICKING

BACKGROUND OF THE INVENTION

1. Field of the Invention

The invention relates to a method and a device for the preparation of slaughtered poultry for picking wherein the bodies of the poultry are subjected to scalding to facilitate picking.

2. Description of the Prior Art

It is known that poultry, such as for example hens, geese, or turkeys are scalded in heated water to prepare the poultry for picking. For this purpose the bodies of the poultry are conventionally added to heated water for a predetermined time.

Known devices comprise water vats containing the heated water through which the poultry bodies are passed using a conveyor line. A first disadvantage of a process of this type and of the known devices is that the feathers of each body passing through the water vat absorbs water so that water consumption occurs. Another particularly severe disadvantage is that substances, such as blood, excrements or dirt are added to the water by each body. This renders the water extremely dirty and contaminated by bacteria after a short time. Every additional body passing through the water vat comes into contact with the dirt, bacteria and germs of all the previous bodies which have already passed through the water vat.

To keep the contamination of the water, particularly with germs and bacteria, within acceptable limits, the contaminated water is exchanged on a regular basis. For this purpose the hot water is discharged from the water vats into the sewage system which presents not only a health hazard but also is an extreme pollutant of the environment and to the sewage treatment plants, respectively. Furthermore, by discharging the hot water useful heat energy is lost and energy must be provided for the heating of fresh water.

SUMMARY OF THE INVENTION

The invention provides an improved method for scalding slaughtered poultry and a device for carrying out the method.

The method according to the invention introduces water vapor into a scalding compartment and the scalding compartment is heated to a predetermined temperature, the bodies of the poultry are introduced into the heated scalding compartment, within the scalding compartment at least one flow of a water vapor-air mixture contained therein is generated, and the at least one flow is guided against predetermined regions of at least one of the bodies of the poultry.

The method does not contaminate water as in the prior art and therefore, eliminates the water disposal problem of the prior art. The water vapor-air mixture, which is guided against predetermined regions of at least one of the bodies of the poultry, results in the condensation of the water vapor on the skin of the bodies thus achieving the requisite scalding. In order to prevent the flow of the water vapor-air mixture from being deviated by the dense feathers of the bodies of the poultry, the flow should be preferably aimed in the direction of the feathers causing the feathers to be stretched out from a position lying on the body under the flow and thus enabling the water vapor-air mixture and the heat contained therein to have a direct contact with the skin.

The predetermined regions against which the flow is directed preferably are regions where the feathers are harder to pick than in other areas of the poultry bodies. Thus there may be provided flows which are guided for example against the back, the neck and the legs. Varied or specifically adapted flows, respectively, may be allocated to different regions of the poultry bodes.

An optimal and quick heating may be achieved by using the thermal currents within the scalding compartment if the water vapor is introduced into the lower regions of the scalding compartment. The water vapor will then ascend from the lower regions optionally with turbulence into the upper regions of the scalding compartment.

Experiments have shown that optimal scalding effects are generated if the scalding compartment is heated to a temperature of about 48° C. to 65° C. However, the temperature selected in each case depends on the type of poultry and the time during which the flow is guided against the predetermined regions of the bodies.

According to an embodiment of the invention, saturation of the air present within the scalding compartment by water vapor is provided. Condensation effects are achieved at the relatively cool skin surfaces of the bodies when saturation exists resulting in a release of condensation heat which contributes to a scalding effect. However, it is also contemplated that other degrees of saturation, which are different from absolute saturation, provide good results in achieving a scalding effect.

The poultry bodies are passed through the scalding compartment hanging by their feet at a preset transport rate along a path of a transporting line. For example the bodies are hung with their feet at hook or loop elements of the transporting line spaced in a predetermined uniform distance from each other. However, hanging of the bodies in this case merely is a preferred variation of transport through the scalding compartment. It is also contemplated to connect the bodies to the transporting line in other manners which achieve a fixed position.

The flow of the water vapor-air mixture preferably is generated preferably as part of a circulation loop. For this purpose, the water vapor-air mixture is removed from the scalding compartment in predetermined regions and is reintroduced at other predetermined regions in a planned manner after being circulated in the loop. Preferably the water vapor-air mixture is removed from the upper region of the scalding compartment where the temperature is highest due to thermal currents.

For rapid cooling of the scalding compartment, the circulation path is opened to the outer environment, when needed. This is particularly required when the transporting line stops, for example due to an interruption at another station of a slaughter line since otherwise the bodies could be damaged due to a prolonged residence time within the scalding compartment.

In the method according to the invention, the bodies are successively transported past a plurality of guided flows of a water vapor-air mixture within the scalding compartment. The advantage of this step is that in this manner the method may be applied to all slaughter lines or paths, respectively, through which the transporting lines pass at a constant passing speed.

According to a preferred embodiment of the invention, it is possible to control and measure the temperature and the vapor content of the water vapor-air mixture. In this manner, different influences and varying parameters may by managed by means of the method. It is further provided that the rate of the flow of the water vapor-air mixture can be controlled and measured. It should be understood that also all other parameters influencing the method can be controlled and measured.

The system of the invention includes a scalding compartment, a device for introducing water vapor into the scalding compartment, at least one, transporting line for transporting the poultry through the scalding compartment, a flow generation device for the generation of at least one flow of a water vapor-air mixture within the scalding compartment and a guiding device for guiding the flow of the water vapor-air mixture against specific regions of at least one of the bodies of the poultry. The scalding compartment preferably has a size enabling entry by a person. This has the advantage that the scalding compartment can be easily maintained and cleaned.

The device for introducing water vapor preferably is arranged in the lower region of the scalding compartment. For this purpose a simple inlet piece introduces the water vapor into the scalding compartment at a low speed. The low speed of the water vapor ensures a small dynamic pressure in the area of the water vapor nozzles. A small dynamic pressure enables the water vapor to be optimally taken up into the air while preventing an undesired formation of droplets.

Both the inlet and at the outlet of the transporting line, which extends through the scalding compartment, are provided with at least one lock chamber. The lock chambers counteract heat losses at the inlet as well as the outlet of the scalding compartment.

The transporting line is formed as a slaughter line extending through the scalding compartment and has a looped pathway with substantially parallel lines along which the bodies of the poultry hang by their feet in fixed positions. This type of pathway of the slaughter line has the advantage that the space within the scalding compartment is optimally used.

The transporting line has a length within the scalding compartment which is chosen to provide a required residence time of the poultry bodies within the scalding compartment at a predetermined transport velocity speed. The transport velocity is determined by the slaughter line as a whole. The residence time of the poultry bodies within the scalding compartment has for example been determined to be about four minutes in the case of turkeys. This enables the determination of the required length of the portion of the transporting line extending within the scalding compartment.

The flow generation device has at least one fan driven suction line drawing off the water vapor-air mixture from the interior of the scalding compartment and a pressure line with at least one fan for the purposeful introduction of the water vapor-air mixture into the scalding compartment. It is also possible to use axial radial or piston compressors to generate the required pressure jets.

According to one embodiment of the invention, at least one fan has a flap box associated with a suction line thereof. The flap of the flap box may be moved as required and seals an opening of the flap box, which opens to the outer environment. This embodiment enables the rapid introduction of fresh air into the scalding compartment. One instance to move the flap to introduce cool air is a stopping of the transporting line due to an interruption so that the bodies of the poultry would reside too long within the scalding compartment.

The guiding device is equipped with nozzle holders arranged within the scalding compartment. Each nozzle holder arranges and aligns at least one nozzle. It is also possible that air guiding plates are used to guide the flow which are associated with the guiding device.

According to one development, a first nozzle holder is formed particularly as a horizontal tube having a plurality of nozzles arranged along the length thereof and around the perimeter. Each nozzle has a nozzle opening directed against one region of the bodies transported past the nozzle which is predetermined and allocated to the respective nozzle. Each tube preferably extends in the upper region of the scalding compartment since in this way an undesired cooling of the water vapor-air mixture flowing within the tube can be prevented.

A second nozzle holder is formed as a dead ended tube extending vertically between the poultry bodies. The second nozzle holder has nozzles arranged along the length and around its perimeter. Each nozzle has its nozzle opening directed against one region of the body transported past the nozzle which is predetermined and allocated to the respective nozzle. A dead ended tube is a tube having a closed end. It is within the scope of the invention that the end of the second tube is provided with a nozzle or is formed as a nozzle, respectively. According to a preferred embodiment, the tube extents in a curved shape around the bodies of the poultry so that the individual nozzles may be placed particularly close to the bodies.

The first and the second nozzle holders are arranged in rows located between substantially parallel runs of the slaughter line defining a looped pathway. This embodiment also enables a compact construction of the system. In this manner each nozzle holder simultaneously provides flows to two bodies. Each of the two bodies is present at a run of substantially parallel pathways and enclosing the nozzle holder between them.

According to another improvement of the invention, an automatic measuring and controlling system is provided for measuring and controlling the temperature and the vapor content of the water vapor-air mixture within the scalding compartment. Furthermore an automatic measuring and controlling system for measuring and controlling the flow rate of the water vapor-air mixture within the scalding compartment is provided within the flowing device, Such measuring and controlling systems comprise known sensors and measuring devices providing measuring values which can be evaluated in an electronic manner. It is within the scope of the invention that the measuring and controlling systems provided herein are evaluated and controlled by means of a device using electronic data processing.

BRIEF DESCRIPTION OF THE DRAWINGS

The invention is described in the following in more detail with reference to the drawing, in which.

Like parts designate like parts throughout the drawings.

DETAILED DESCRIPTION OF THE INVENTION

Figure 1:
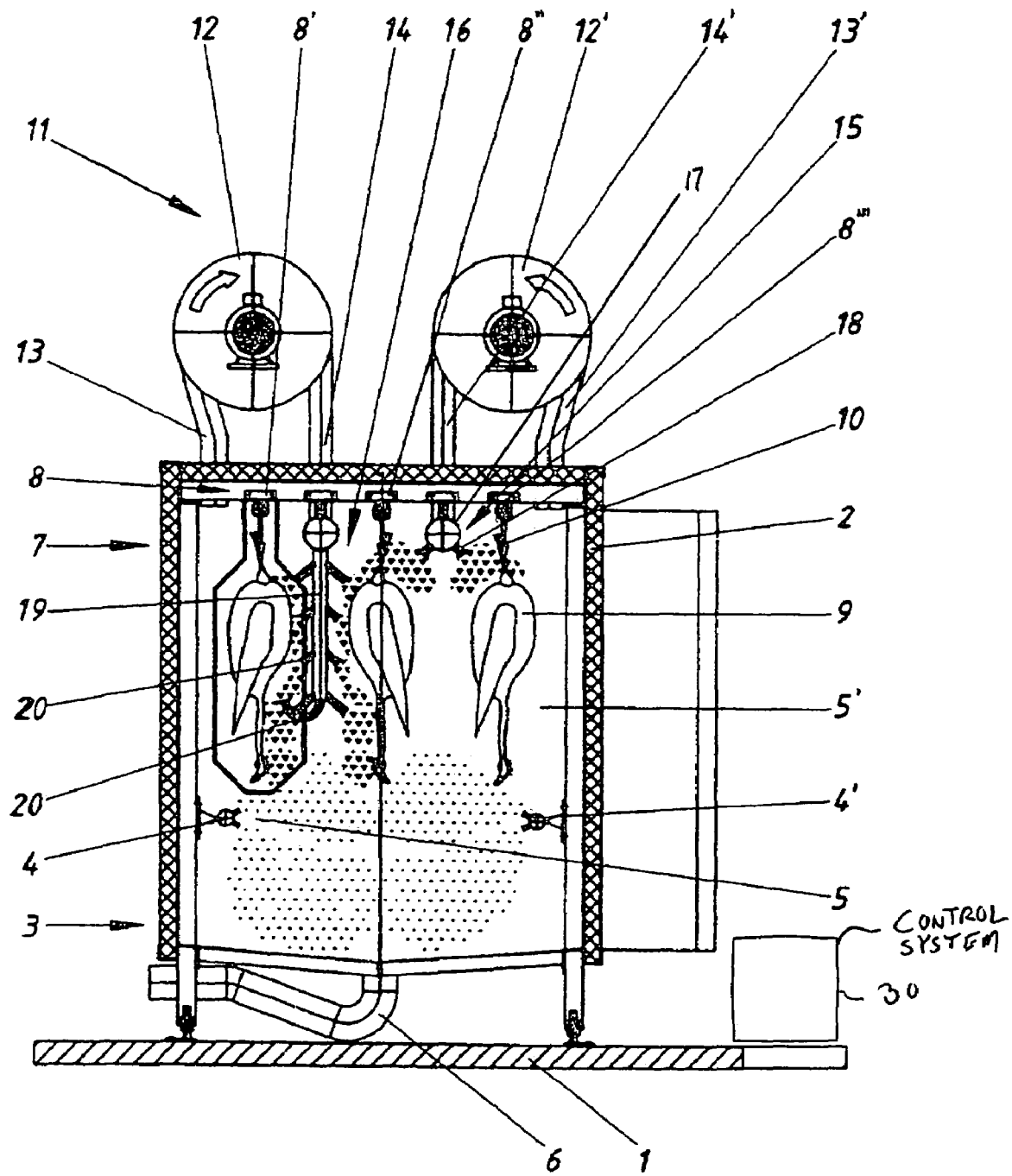
FIG. 1 shows a side sectional view of a system according to the invention.

FIG. 1 shows a top sectional view of the system according to the invention. On a base 1 a scalding compartment 2 is positioned having in a lower region 3, a water vapor introduction system 4, 4' including two vapor nozzles for introducing water vapor 5. At the lowest position of the scalding compartment 2, a draining tube 6 is provided for the removal of condensation water forming on the walls of the scalding compartment 2. In the upper region 7 of the scalding compartment 2, a transporting line 8 is provided extending through the scalding compartment 2 and formed as a slaughter line in a looped pathway having parallel runs 8', 8'', 8'''. On the slaughter line, the bodies 9 of the poultry are preferably hung by their feet 10 at fixed positions. A flow generating device 11 has two fans 12, 12' located at the exterior of the scalding compartment 2. The fans 12 and 12' respectively have a suction lines 13, 13' which draw off the water vapor-air mixture 5' from the scalding compartment 2. The fans 12 and 12' respectively have pressure lines 14, 14' which introduce a water vapor-air mixture 5' into the scalding compartment 2 in a planned manner.

A part of pressure lines 14, 14' extending within the scalding compartment 2 form a flow guiding device formed as nozzle holders 15, 16. First nozzle holders 15 comprise a horizontal tube 17 having a plurality of nozzles 18 arranged along the length thereof at the perimeter thereof. Second nozzle holders 16 comprise a dead end tube 19 with a closed end extending vertically between the bodies 9 and having a plurality of nozzles 20 arranged along the length thereof at the perimeter. In this respect, each nozzle 18, 20 has its nozzle opening directed toward one region of the body 9 transported past the nozzle.

The second nozzle holders 16 are arranged in rows wherein the rows are arranged between substantially parallel runs 8', 8'' of the transporting line 8 having a looped pathway.

Figure 2:
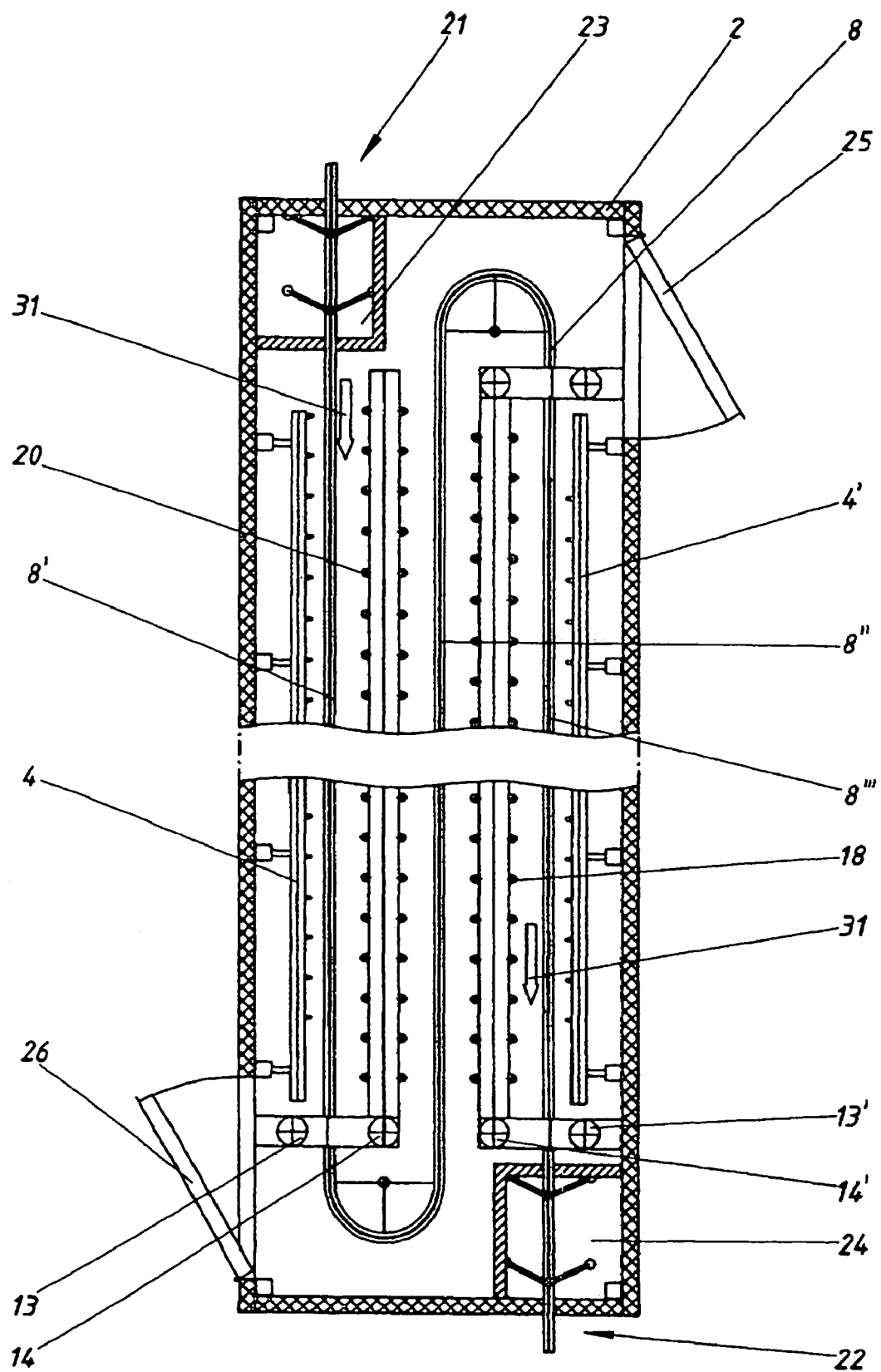
FIG. 2 shows a top sectional view of the system according to the invention.

FIG. 2 shows a top sectional view of the device. The scalding compartment 2 has the inlet area 21 and the outlet area 22 of the transporting line 8, a lock chamber 23, 24 which extends therein which provides sealing of the water vapor from passing outside of the scalding compartment. Furthermore the scalding compartment 2 has two access doors 25, 26 serving as an entrance for persons.

Figure 3:
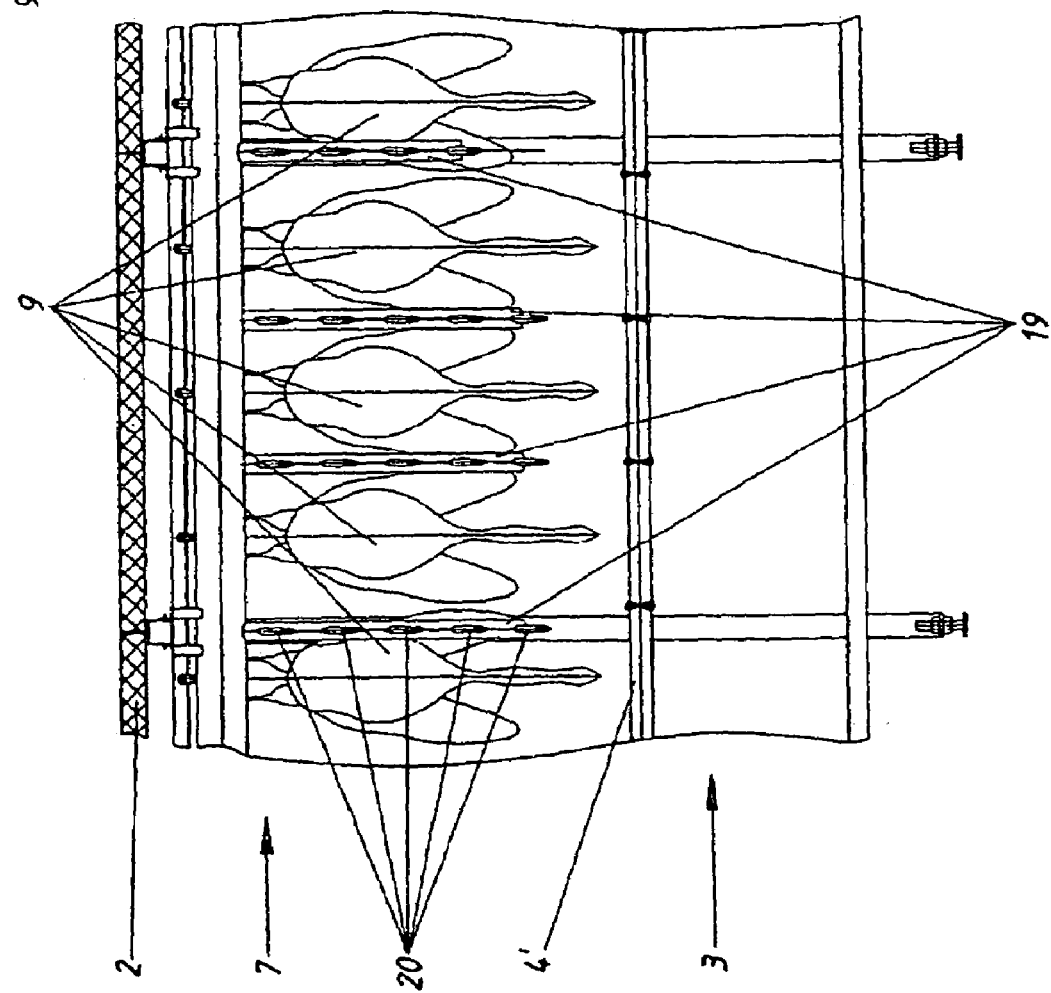
FIG. 3 shows a partial sectional front view of the system.
Figure 4:
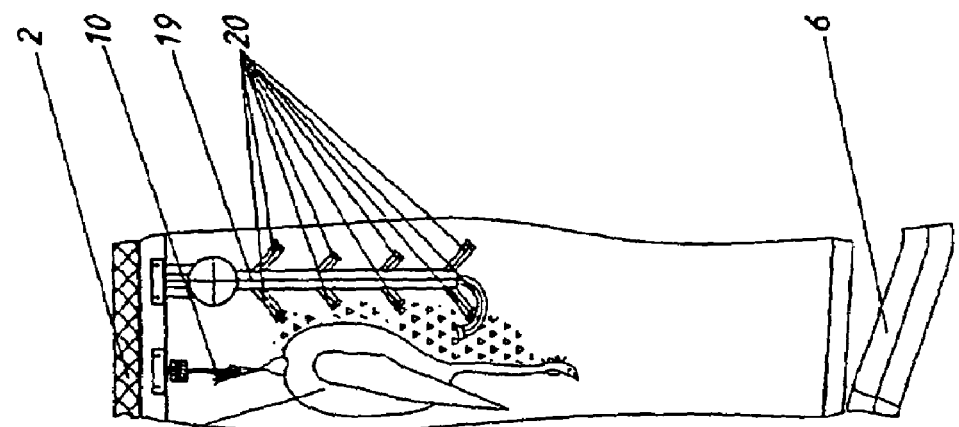
FIG. 4 shows a side view of the system in a first partial section.

FIGS. 3 and 4 respectively show a side and front views of the system as a first partial section. The nozzles 20 are dead end tubes 19 which are each directed against a predetermined region of each poultry body 9 transported past the nozzle.

Figure 6:
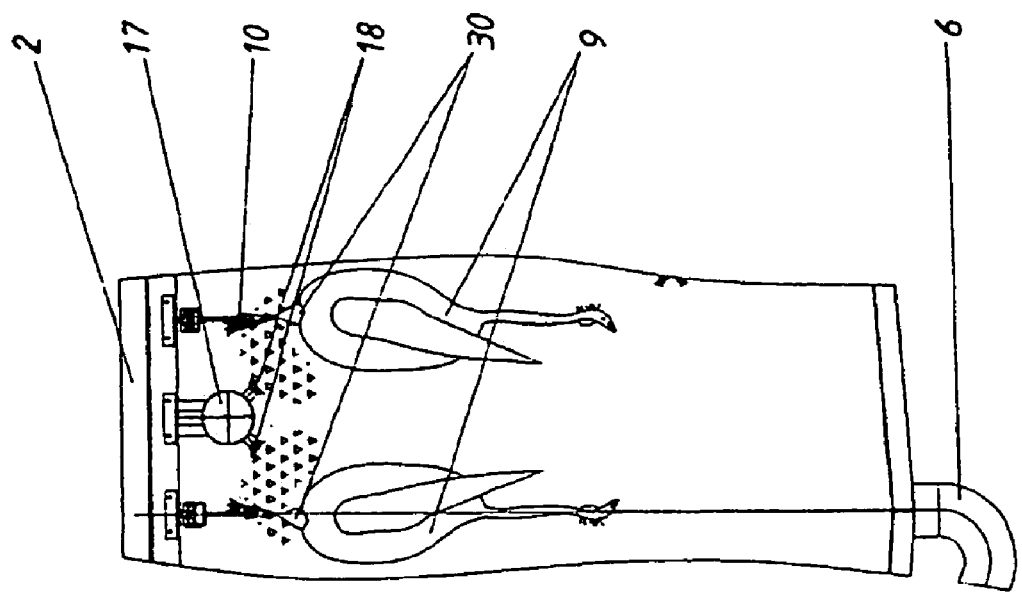
FIG. 6 shows a side view of the system in a second partial section.
Figure 5:
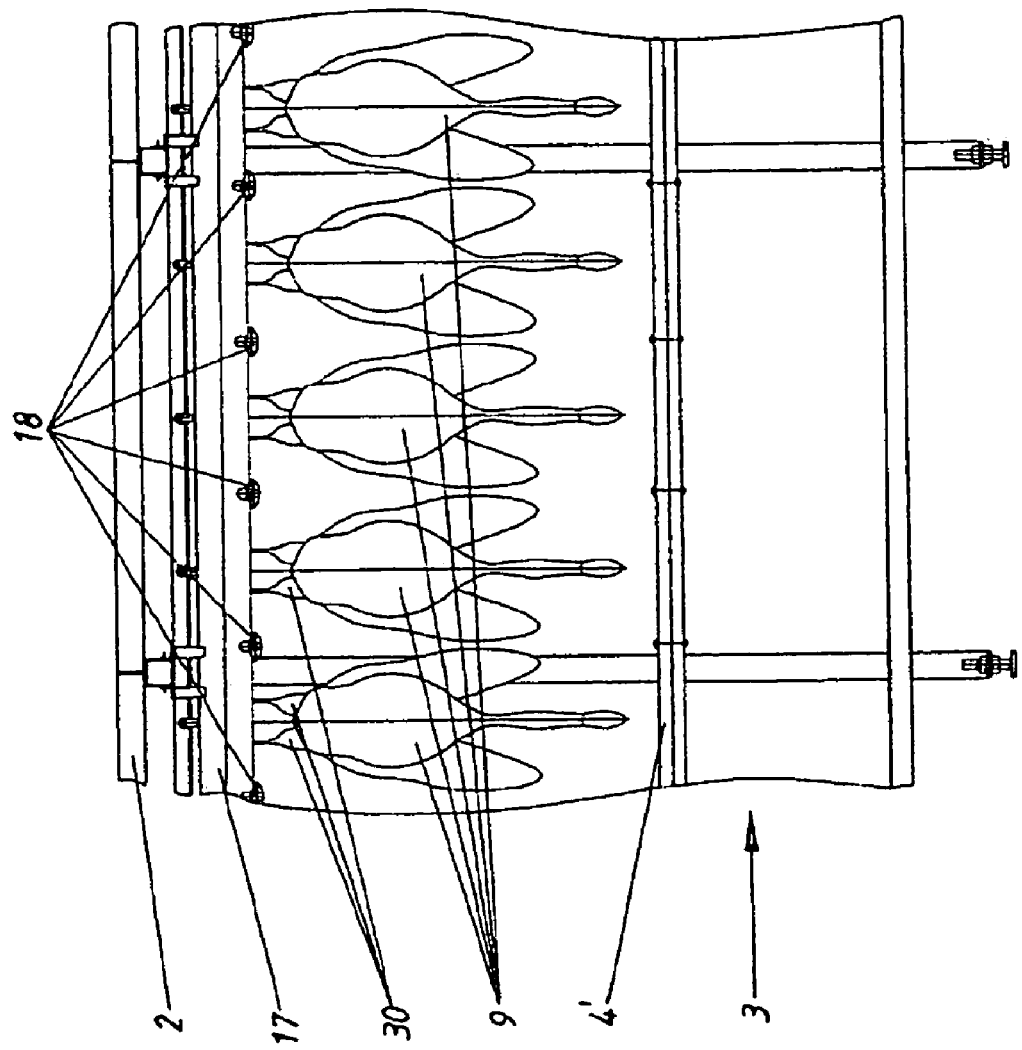
FIG. 5 shows a front view of the system in a second partial section.

FIGS. 5 and 6 respectively show front and side views of the system in a second partial section. The nozzles 18 of a horizontal tube 17 are directed against the legs 30 of the poultry bodies 9 hanging from the transporting line 8.

The present invention functions as follows: Water vapor 5 is introduced into the scalding compartment 2 for generating a water vapor-air mixture. For this purpose the scalding compartment 2 is heated to a predetermined temperature. The bodies 9 of the poultry are passed through scalding compartment 2 hanging by their feet 10 with a preset velocity in the direction of the arrows 31 along the pathway of the transporting line 8. The poultry bodies 9 pass through the inlet area 22 of the lock chamber 23 while being transported substantially parallel to the horizontal tube 17 and the nozzles 18 thereof. At the end of the horizontal tube 17, the poultry bodies 9 are turned around along the loop-like pathway of the transporting device 8 and are transported in the opposite direction between the horizontal tube 17 and along the vertical dead ended tubes 19 arranged in rows and where the nozzles 18 and 20 respectively direct a water vapor air mixture against selected regions of the bodies 9 of the poultry bodies. At the end of this passage, the bodies 9 of the poultry are again turned around by 180° by the transporting line 8 with a looped pathway and are transported back along the other side of the vertical dead end tubes 19 which are arranged in rows and the nozzles 20 thereof by the transporting line 8 having a looped pathway. Eventually the poultry bodies 9 pass through the lock chamber 24 at the outlet area 22 and leave the scalding compartment 2 still hanging at their feet 10 from the transporting line 8 formed as a slaughter line. During the whole passage of the poultry bodies 9 through the scalding compartment 2, the predetermined regions of the bodies 9 of the poultry bodies are subjected to the flow of the water vapor-air mixture 5' from nozzles 18, 20 respectfully of the horizontal tube 17 and the vertical tubes 19.

The system may include an automatic measuring and controlling system 30 for optionally measuring and controlling (1) temperature and vapor content of the water vapor-air mixture within the scalding compartment 2 and/or (2) a flow rate of the water vapor-air mixture within the low generating device 11. The electrical connections between the motors of the fans 12, 12' and the heat source and water source, which are not illustrated, have been omitted for the reason that they are not part of the invention.

The invention claimed is:

1. A method for the preparation of slaughtered poultry for picking wherein bodies of the poultry are scalded comprising introducing heated water vapor into a heated scalding compartment, which is heated to a predetermined temperature, introduced the bodies of the slaughtered poultry into the heated scalding compartment, generating at least one flow of a water vapor-air mixture obtained from within the scalding compartment and guiding the at least one flow of water vapor-air mixture against predetermined regions of at least one of the bodies of the poultry which are more difficult to pick than other regions of the poultry bodies with the scalding being performed without the bodies of the slaughtered poultry being submersed in water.

2. A method according to claim 1, wherein water vapor is introduced into a lower region of the scalding compartment.

3. A method according to claim 2, wherein the scalding compartment is heated to a temperature of about 48° C. to 65° C.

4. A method according to claim 1, wherein the scalding compartment is heated to a temperature of about 48° C. to 65° C.

5. A method according to any of the claim 1, wherein the air present within the scalding compartment is saturated by water vapor.

6. A method according to claim 1, wherein the bodies of the poultry are passed through the scalding compartment hanging by their feet with a preset velocity along a pathway of a transporting line within the scalding compartment.

7. A method according to claim 5, wherein a portion of the pathway of the transporting line within the scalding compartment is varied in length.

8. A method according to claim 1, wherein the flow of the water vapor-air mixture is circulated through the scalding compartment.

9. A method according to claim 8, wherein the circulation is opened to the outer environment when cooling of the scalding compartment is required.

10. A method according to claim 1, wherein the bodies of the poultry within the scalding compartment are transported successively past a plurality of guided flows of the water vapor-air mixture.

11. A method according to claim 1 wherein:
the at least one flow of a water vapor-air mixture guided against predetermined regions of at least one of the bodies of the poultry comprises first nozzles attached to at least one horizontal tube which direct the water vapor-air mixture against legs of the at least one of the bodies and second nozzles attached to at least one vertical tube which direct the water vapor-air mixture against portions of the at least one of the bodies below the legs.

12. A method according to claim 1, wherein the temperature and vapor content of the water vapor-air mixture are controlled and measured.

13. A method according to claim 1, wherein a rate of the flow of water vapor-air mixture is controlled and measured.

14. A system for the preparation of slaughtered poultry for picking comprising a scalding compartment, a water vapor source for introducing water vapor into the scalding compartment, at least one transporting line for transporting bodies of the slaughtered poultry through the scalding compartment, a flow generation device which generates at least one flow of a water vapor-air mixture within the scalding compartment, and a guiding device for guiding the at least one flow of the water vapor-air mixture against predetermined regions of at least one of the bodies of the poultry which are more difficult to pick than other regions of the poultry bodies with the scalding being performed without the bodies of the slaughtered poultry being submersed in water.

15. A system according to claim 14, wherein the device for introducing the water vapor is in the lower portion of the scalding compartment.

16. A system according to claim 14, wherein the scalding compartment has at least one lock chamber at an inlet area and at least one lock chamber at an outlet area of the transporting line for sealing the water vapor from passing to an exterior of the scaling compartment.

17. A system according to claim 14, wherein the transporting line is a slaughter line extending through the scalding compartment having a looped pathway having runs running substantially parallel to each other with respect to the bodies of the poultry hanging by their feet in fixed positions.

18. A system according to claim 14, wherein the transporting line within the scalding compartment has a length which is chosen based upon a required residence time of the bodies of the poultry within the scalding compartment at a preset velocity.

19. A system according to claim 14, wherein the flow generation device includes a fan and a suction line drawing off the water vapor-air mixture from an interior of the scalding compartment and a pressure line which reintroduces the water vapor-air mixture into the scalding compartment.

20. A system according to claim 19, wherein at least one fan has a flap box associated with the suction line thereof including a flap which moves in response to suction and which seals an opening of the flap box which may be opened to the outer environment when suction is not applied.

21. A system according to claim 14, wherein the guiding device has nozzle holders arranged within the scalding compartment for arranging and adjusting at least one nozzle in the scalding compartment.

22. A system according claim 21, wherein a first nozzle holder comprises a horizontal tube having a plurality of nozzles arranged across a length of the at least one transporting line and at a perimeter thereof openings of the nozzle are directed against a predetermined region of the bodies of the poultry transported past the nozzles.

23. A system according to claim 22, wherein the first nozzle holders are in rows with the rows being located between parallel runs of the at least one transporting line which extends in a looped pathway and is part of a slaughter line.

24. A system according to claim 21, wherein a second nozzle holder comprises a closed end tube extending vertically between the bodies of the poultry comprising a plurality of nozzles disposed along a length of the tube and on a perimeter thereof with each nozzle including a nozzle opening directed against a predetermined region of the bodies of the poultry transported past the nozzle.

25. A system according to claim 14, comprising an automatic measuring and controlling system for measuring and controlling temperature and vapor content of the water vapor-air mixture within the scalding compartment.

26. A system according to claim 14, comprising an automatic measuring and controlling system for measuring and controlling a flow rate of the water vapor-air mixture within the flow generating device.

27. A system according to claim 14 wherein:
the at least one flow of a water vapor-air mixture guided against predetermined regions of at least one of the bodies of the poultry comprises first nozzles attached to at least one horizontal tube which direct the water vapor-air mixture against legs of the at least one of the bodies and second nozzles attached to at least one vertical tube which direct the water vapor-air mixture against portions of the at least one of the bodies below the legs.

* * * * *